Feb. 11, 1930.    D. R. PRICE    1,747,079
MERCURY WATTHOUR METER
Filed April 25, 1929

Inventor:
David R. Price,
by Charles E. Tullar
His Attorney.

Patented Feb. 11, 1930

1,747,079

UNITED STATES PATENT OFFICE

DAVID R. PRICE, OF LYNN, MASSACHUSETTS, ASSIGNOR TO GENERAL ELECTRIC COMPANY, A CORPORATION OF NEW YORK

MERCURY WATT-HOUR METER

Application filed April 25, 1929. Serial No. 358,074.

My invention relates to improvements in watt-hour meters of the mercury type and in particular to such meters which are employed on circuits of greatly varying current and voltage and its object is to improve the accuracy of this type of meter under such conditions.

In certain applications where it is desirable to measure the energy of an electric circuit it happens that the current and voltage vary several hundred per cent and that when the voltage is low the current is high and vice versa. One such case is on the gasoline electric bus or railway car. At the starting point of the bus the current will be high and the voltage low and their relative values will shift as the bus accelerates. Low current and voltage values will not occur simultaneously in such applications but the variation is considerable. For example the voltage may vary from 25 to 500 volts while the current is varying in the opposite relation. The ordinary mercury type meter will not measure the energy of such a circuit with satisfactory accuracy since under such conditions it is subject to errors which may be traced to one or more causes, generally including the saturation of some portion of the magnetic circuit at the higher voltages, excessive hysteresis in some portion of the magnetic circuit and a voltage flux damping error.

The present invention has for its main objects the reduction or compensation of these errors to provide a high accuracy mercury watthour meter when used under such greatly varying current and voltage conditions as have been referred to above.

The features of my invention which are believed to be novel and patentable will be pointed out in the claims appended hereto. For a better understanding of my invention reference is made in the following description to the accompanying drawing in which Figure 1 represents the features of my invention applied to a mercury watthour meter, and Figure 2 are torque voltage curves to be referred to in explaining the voltage error compensating feature of my invention.

Figure 1:
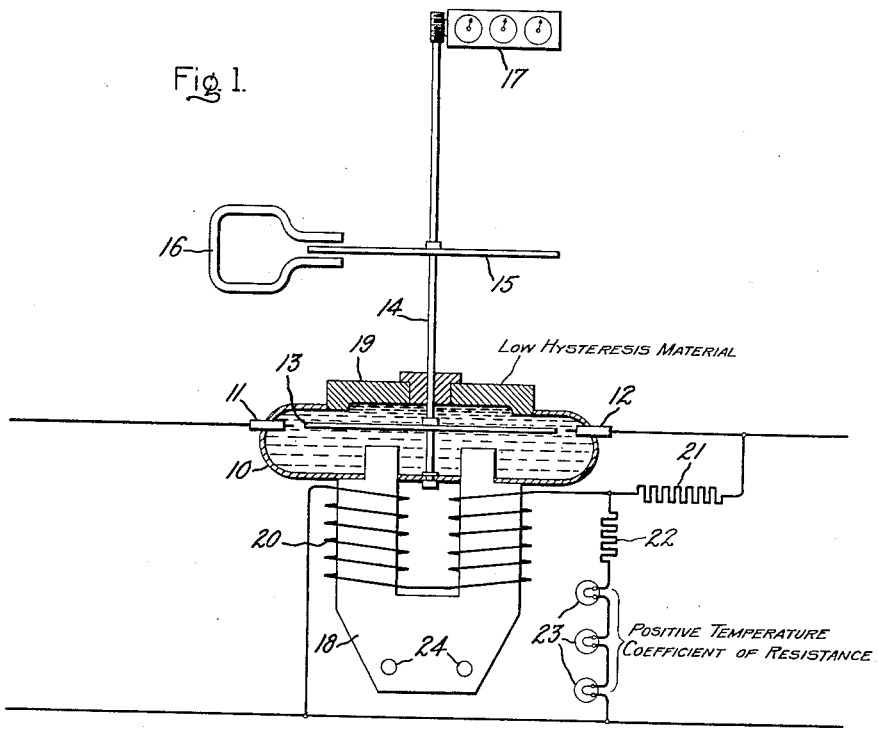
Figure 2:
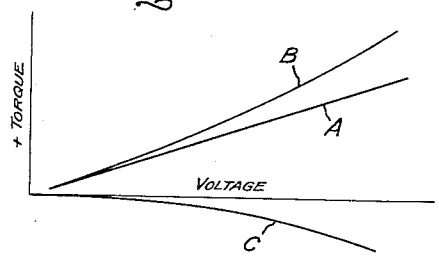

In the drawing, Figure 1, I have shown a mercury type watthour meter having a magnetic circuit especially designed to avoid saturation and to be free from excessive hysteresis errors. The meter is represented as connected in circuit and the voltage connections include a voltage error compensating arrangement.

The mercury chamber is represented at 10. The current terminals are shown at 11 and 12 and connect the mercury element directly in one side of the load circuit. The rotating disc armature 13 is immersed in the mercury and is mounted on a shaft 14 which extends through a suitable top bushing. The shaft carries a damping disc 15 cooperating with a permanent magnet 16. The meter register is represented at 17. 18 represents the core of the voltage magnet and 19 the magnetic keeper therefor on the opposite side of the disc 13. 20 is the voltage coil of the meter and is connected across the line through a high resistance 21. The voltage coil is shunted by a compensating circuit having a varying resistance characteristic and as here represented contains a resistance 22 and one or more lamps 23.

Referring to the magnetic circuit of the meter, the U-shaped laminated voltage magnet core is so designed as to have all parts remain unsaturated at the maximum voltage liable to be encountered and to give the correct flux distribution at the armature on all voltages. The lower portion of the U has substantially twice the effective cross-section as the pole piece portions which extend into the mercury chamber. In the ordinary meter the voltage magnet core has a cross-section about equivalent to that of the restricted portion shown at the pole pieces in the drawing and its cross-section is generally uniform from one pole piece to the other. In applicant's core the supporting bolt holes are represented at 24 outside the normal path of the flux. Investigation shows that when these bolt holes are included in the normal flux path the core, as is usually the case, saturation occurs at the high flux densities encountered resulting in corresponding meter errors. To prevent such saturation it is necessary to extend the core material as here represented and place these bolt holes well outside the normal flux path leaving sufficient material to carry the maximum flux without producing flux eddies and saturated conditions adjacent such holes. The leakage flux from this type of magnet is excessive and starts well below the portion of the core which enters the mercury chamber. If the cross-section of the core at the pole tips is made only large enough to properly confine the flux at low flux densities and to prevent saturation at maximum flux densities it is necessary to make the lower portion of the core of a materially greater cross-section if saturation in such portion is to be avoided. The ratio of flux in the lower portion of the U-shaped core to that in the restricted portion at the pole tips may be as high as 3 to 1, in some cases. The core as here represented is so proportioned that saturation will not occur at any joint.

The magnetic keeper 19 on the upper side of the disc 13 is preferably made of a ring of permalloy which is the high permeability, low hysteresis nickel-iron alloy described in Elmen Patent No. 1,586,884, June 1, 1926. This material has a composition of approximately 78½% nickel and 21½% iron and below the saturation point it has a much higher permeability and lower hysteresis loss than the best magnetic iron. By making the keeper 19 of this material the hysteresis error of the meter, which is ordinarily very large with greatly varying voltages, is materially reduced.

The voltage flux in addition to cooperating with the current passing through the meter disc to produce the meter torque, also produces a certain amount of damping of the disc. This damping effect increases as the square of the voltage flux passing through the disc and although small as compared with the meter torque it produces an appreciable error when wide variations in voltage are encountered. This error is compensated for by the compensating circuit in shunt to the voltage coil. This shunt circuit has a positive temperature coefficient of resistance and serves in the combination to rob the voltage coil of current at low voltages.

In order to explain this compensating feature I will assume for the purpose of illustration that the maximum voltage of the metered circuit is 500 volts. The swamping resistance 21 in series with the voltage coil and compensating circuit may then be of the order of 5000 ohms and carry such a current as to produce a 400 volt drop across it at the maximum voltage. This reduces the voltage across the voltage coil and compensating circuit to 100 volts. The resistance at 22 may comprise a 750 ohm resistor having approximately a zero temperature coefficient of resistance. The resistance elements at 23 may be 15 watt tungsten lamps operating at reduced voltage for long life. At the maximum voltage encountered these lamps may operate at a cherry red glow. The temperature coefficient of resistance of the tungsten lamps is positive and while it is only about .5 nevertheless over the great range of temperature possible the change in resistance of this shunt circuit is considerable. For example, from cold to full heat temperature the resistance of the lamp filament increases some 1600%. Lamps are very convenient to use here since they are uniform in resistance and come in various sizes so that a desired resistance combination may be easily arrived at. Any combination of resistances in this compensating circuit which will give the desired resultant positive temperature coefficient of resistance will serve the purpose. At low voltages the lamp circuit will take a larger proportion of the current flowing through resistance 21 than at the higher voltages. As a result, the current in coil 20 will increase at a greater rate than the line voltage and this increase is made sufficient to substantially compensate for the voltage flux damping error.

The reason for this compensation will be clearer if we assume in Figure 2 that curve A represents the desired resultant meter torque at constant current with increasing line voltage. The actual meter torque however is made to have the characteristics of curve B due to the compensating feature. The damping produced by the same voltage flux may be represented by the curve C and is negative because it opposes rotation. The difference between curves B and C is the resultant meter torque and by proper adjustment of the compensating circuit may be made to closely approach the desired curve A.

I have found that a mercury meter constructed in accordance with the foregoing principles may have an accuracy within plus or minus 1% when used on circuits having a voltage variation from 25 to 500 volts.

In accordance with the provisions of the patent statutes I have described the principle of operation of my invention, together with the apparatus which I now consider to represent the best embodiment thereof. Such changes in structure and arrangement of the parts of the apparatus as do not depart from the scope of my invention are intended to be covered in the appended claims.

What I claim as new and desire to secure by Letters Patent of the United States, is:

1. A mercury type watthour meter comprising a mercury chamber, a rotatable disc armature therein, a U-shaped voltage magnet on one side of said disc, a magnetic keeper for said voltage magnet on the other side of said disc, said keeper being composed of magnetic material having a materially smaller hysteresis loss than that of iron.

2. A mercury type watthour meter comprising a mercury chamber, a rotatable disc therein, a U-shaped voltage magnet on one side of said disc with the open end of the U facing the disc, a magnetic keeper for said voltage magnet on the opposite side of said disc, said voltage magnet having pole pieces extending into the mercury chamber of sufficient cross-section to carry the flux therethrough without saturation and the remaining portion of said magnet having a cross-section substantially twice as great as the cross-section of one of said pole pieces.

3. A mercury type watthour meter comprising a mercury chamber, a disc armature therein, a U-shaped voltage magnet having restricted pole pieces extending into said mercury chamber below said disc, said magnet having bolt hole openings therethrough outside of said mercury chamber, the flux carrying cross-sectional area of the magnet adjacent said bolt holes being substantially twice the cross sectional area of the pole piece portions.

4. A mercury type watthour meter having a voltage electromagnet, a coil thereon, a circuit having a positive temperature coefficient of resistance connected in shunt to said coil, and a resistance adapted to be connected in series with said coil and shunt circuit across the line to be metered, the resistances of the coil, shunt circuit and series resistance being proportioned to cause the current in the voltage coil to increase at a greater rate than the applied line voltage to compensate said meter for voltage errors.

5. A mercury type watthour meter having a voltage electromagnet, a coil thereon, a circuit connected in shunt to said coil containing at least one incandescent lamp to give such shunt circuit a temperature coefficient of resistance characteristic which is more positive than that of the circuit of the coil, a resistance connected in series with said coil and shunt circuit, the coil and resistance circuit constituting the voltage circuit of the meter adapted for connection across the line to be metered, the voltage circuit as thus constituted being proportioned so that the greatest drop in voltage therein occurs across the series resistance.

In witness whereof, I have hereunto set my hand this twenty-second day of April, 1929.

DAVID R. PRICE.